C. C. DELIN.
MOTOR PLOW.
APPLICATION FILED MAR. 21, 1910.

1,047,507.

Patented Dec. 17, 1912.

2 SHEETS—SHEET 1.

UNITED STATES PATENT OFFICE.

CLAUDE CHARLES DELIN, OF SANCERRE, FRANCE.

MOTOR-PLOW.

1,047,507.  Specification of Letters Patent.  Patented Dec. 17, 1912.

Application filed March 21, 1910. Serial No. 550,707.

*To all whom it may concern:*

Be it known that I, CLAUDE CHARLES DELIN, a citizen of the French Republic, residing at Sancerre, Cher, in France, have invented certain new and useful Improvements in Motor-Plows, of which the following is a specification.

The present invention relates to a novel form of motor plow which is provided with a cutting and perforating device which allows the plow to more readily penetrate both vertically and horizontally into the soil to be worked and which, consequently, reduces to a considerable extent, the propelling effort required with the hitherto known systems of team or mechanically propelled plows. The plowing of the soil is effected in as complete a manner as with the best ordinary plows.

The invention is shown in the accompanying drawings, in which—

Figure 1:
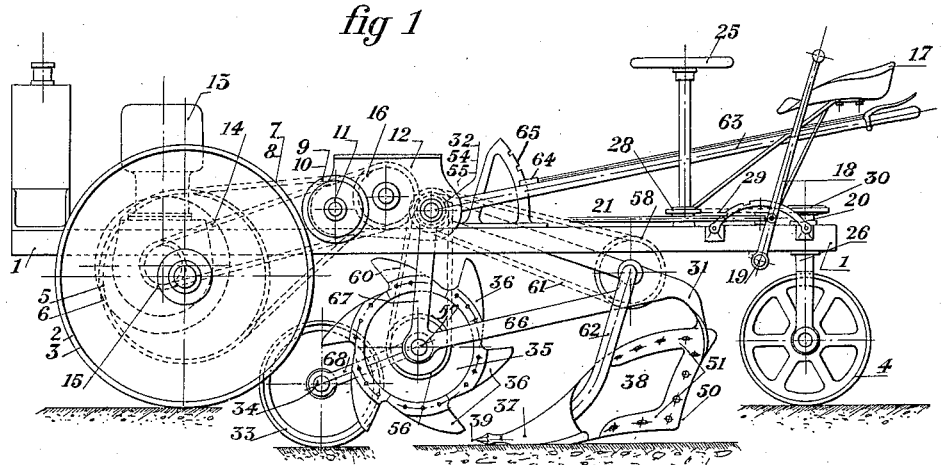
Figure 2:
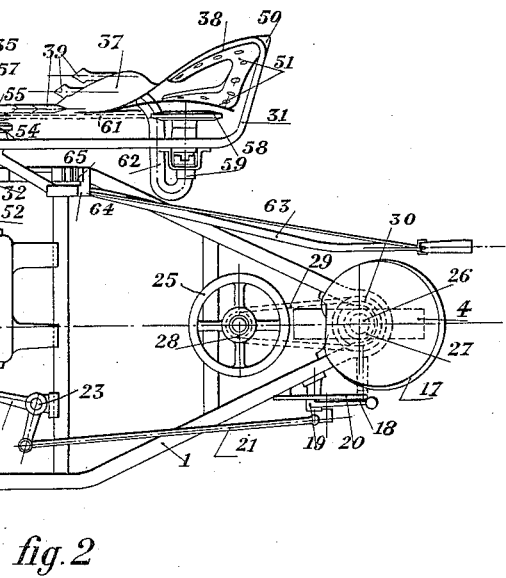
Figure 3:
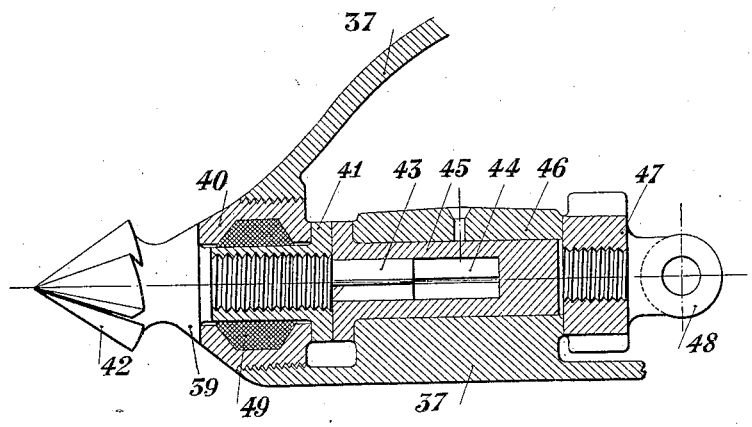
Figure 4:
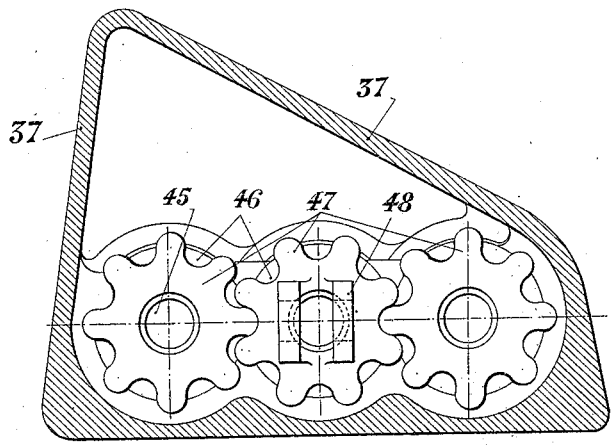

Figure 1 is a side elevation, Fig. 2 a plan view, Fig. 3 is a longitudinal section of a perforating tool, and Fig. 4 is a cross section of Fig. 3.

The novel plow comprises two distinct parts, viz. firstly the motor vehicle and secondly, the working or plowing apparatus proper.

The frame 1 of the motor vehicle is carried at the front by two driving wheels 2 and 3, and at the rear by a steering wheel 4. The driving wheels 2 and 3 are actuated by the wheels 5 and 6 driven by chains passing about sprockets 9 and 10 mounted at opposite ends of the shaft 11 of the differential gear contained in gear case 12. The gearing in said case is connected to the motor 13, by means of the chain 14 and sprocket wheels 15 and 16, said motor being supported by the frame. The control is effected from the driver's seat 17 located at the back of the plow, by means of a lever 18 pivoted at 19 and working in a toothed sector 20. To said lever 18 is connected a rod 21, pivoted to one arm of the bell crank 22 pivoted at 23 and connected to a rod 24 which controls the speed gear. The steering wheel 25 controls the movements of the wheel 4 by rotating its pivot 26 to the required angle in the socket 27 rigid with the frame by means of a pinion 28 actuating the chain 29 passing about a sprocket wheel 30, keyed on said pivot 26.

The plowing apparatus proper of the machine is located at the right hand side of the motor vehicle and comprises a rigid bracket 31 rotatable about a pivot 32 and carrying the plowing implements. The wheel 33 freely mounted on a shaft 34, serves as a guide by running in the furrow previously formed; the circular colter 35 of special form provided at its periphery with a series of removable blades 36 is adapted to operate successively during rotation, and finally the plow share 37 having the mold-board 38. The share 37 carries at its forward end a series of perforating tools 39, three such tools being shown set back behind one another so that their points penetrate into the soil on a diagonal line in a horizontal plane. The construction of one of said perforating tools 39 is shown in detail in Fig. 3. The plow share 37 is hollow at the front and is provided with a head 40 having an aperture in which rotates with slight friction, the perforating tool 39 secured against longitudinal displacement by a screw 41. The said perforating tool 39 terminates outwardly in a conical head 42 and interiorly in a squared shaped tail 43. The said tail 43 engages a hole 44 of similar shape provided in the cylindrical member 45 which rotates in a bearing 46, integral with the plow share. A toothed pinion 47 is screwed on the cylindrical member 45 and receives movement by means of the lugs 48, located at the end of a flexible shaft 62 hereinafter described, and said movement is transmitted to the perforating tool.

In Fig. 4, the pinions 47 of the three tools are shown in mesh, the central one being that which is driven, but it is obvious that any of said pinions could be the driven one if desired.

In order to prevent particles of soil or dust from entering the interior of the plow share, a felt washer 49 is fitted in the head 40. The mold-board 38 and rear portion 50 of the plow share 37 present no particular novelty, and are of the form usually adopted, being connected to the bracket 31 at the bifurcated end 51 of the latter. A shaft 52 driven by the gearing in the casing 12 and carried by a bearing 53, carries two chain pinions 54 and 55, the former driving by means of the chain 60, a chain wheel 56, mounted on the shaft 57 of the colter 35 and the latter by means of a chain 61 the chain-wheel 58 rotatably mounted in a bearing 59 carried by the bracket 31 and placed as closely as possible to the mold-board 38. From the center of the chain wheel 58, extends a flexible shaft 62 adapted to transmit the movement of said wheel to the lugs 48 previously mentioned and thus drive the series of perforating tools 39.

The lifting of the plowing apparatus is effected by a hand operated lever 63 rigidly connected to the bracket 31 which it causes to rotate about its pivot 32 and having a latch 64 engaging a notched sector 65 fixed to the frame 1 and which permits of said lever being held in the desired position.

The control of the guiding wheel 33 and of the depth of the colter 35 can be effectd independently of each other by forming the bracket 31 of several pivoted members: for example by rendering longitudinally adjustable the arm 66 of the bracket, the adjustment of the circular colter can be effected; the arm 67 being freely pivoted at 32. With regard to the guiding wheel 33, its supporting arm 68 could be pivoted at 57 and means provided for raising same to the desired height.

Obviously the motor vehicle can be provided with one or more sets of plowing implements and in the latter case, said implements can be either arranged at the back or at each side of the vehicle. In the latter case, the implements on the left hand side can be caused to work alternately with those on the right, that on the left serving for example for plowing in one direction and the other for the reverse direction. Further if one of the plow shares of the two apparatuses is turned in one direction and the other in the opposite direction as in a double plow the soil will be turned to the same side in both directions of movement of the plow.

The machine can also be so constructed as to be drawn by animals, in which case the motor serves only for driving the plowing implements; or the machine can be so formed that the motor is replaced by mechanism, actuated by one of the running wheels, as in the case of reaping or mowing machines.

What I claim as my invention and desire to secure by Letters Patent of the United States is:—

1. A plow comprising in combination a wheeled vehicle, a plow share supported thereby, a series of perforating implements extended forward from the lower edge of the diagonal side of the plow share in a horizontal plane, a rotary colter carried by the vehicle in advance of the foremost of said perforating implements, and means to actuate said perforating implements and to rotate said colter.

2. A plow comprising in combination a wheeled vehicle, a plow share supported thereby, a series of perforating implements extended forward from the lower edge of the diagonal side of the plow share in a horizontal plane, shafts bearing said perforating implements, gears thereon arranged in engagement, and a flexible shaft connected to one of said gears for driving them.

In witness whereof I have signed this specification in the presence of two witnesses.

CLAUDE CHARLES DELIN.

Witnesses:
T. DE LAND,
CH. B. BEYLIARD.

---

Copies of this patent may be obtained for five cents each, by addressing the "Commissioner of Patents, Washington, D. C."